US010211889B2

(12) United States Patent
Pang et al.

(10) Patent No.: US 10,211,889 B2
(45) Date of Patent: Feb. 19, 2019

(54) RF ARCHITECTURE UTILIZING A MIMO CHIPSET FOR NEAR FIELD PROXIMITY SENSING AND COMMUNICATION

(71) Applicants: Hawk Yin Pang, San Jose, CA (US); Rajiv Agarwal, Menlo Park, CA (US); Thomas Alan Donaldson, Nailsworth (GB)

(72) Inventors: Hawk Yin Pang, San Jose, CA (US); Rajiv Agarwal, Menlo Park, CA (US); Thomas Alan Donaldson, Nailsworth (GB)

( * ) Notice: Subject to any disclaimer, the term of this patent is extended or adjusted under 35 U.S.C. 154(b) by 0 days.

(21) Appl. No.: 13/957,337

(22) Filed: Aug. 1, 2013

(65) Prior Publication Data
US 2015/0036760 A1 Feb. 5, 2015

(51) Int. Cl.
*H04B 1/44* (2006.01)
*H04B 7/0413* (2017.01)
*H04B 5/00* (2006.01)

(52) U.S. Cl.
CPC ......... *H04B 7/0413* (2013.01); *H04B 5/0031* (2013.01)

(58) Field of Classification Search
CPC ... H04B 7/0413; H04B 5/0031; H04W 4/023; H04W 4/206
USPC ......... 455/78, 101, 562.1, 41.1, 63.4, 575.7, 455/552.1
See application file for complete search history.

(56) References Cited

U.S. PATENT DOCUMENTS

| | | | |
|---|---|---|---|
| 7,065,382 B2 * | 6/2006 | Alanara et al. | 455/556.1 |
| 7,330,156 B2 * | 2/2008 | Arkko et al. | 343/702 |
| 7,450,072 B2 * | 11/2008 | Kim et al. | 343/700 MS |
| 7,636,554 B2 * | 12/2009 | Sugar et al. | 455/73 |
| 7,714,783 B2 * | 5/2010 | Niu et al. | 342/377 |
| 7,826,346 B2 * | 11/2010 | Seki et al. | 370/216 |
| 7,843,327 B1 * | 11/2010 | DiMartino et al. | 340/539.11 |
| 7,979,033 B2 * | 7/2011 | Rofougaran | 455/73 |
| 8,045,926 B2 * | 10/2011 | Martikkala et al. | 455/63.4 |
| 8,073,400 B2 * | 12/2011 | Gorbachov | 455/83 |
| 8,583,066 B2 * | 11/2013 | Soul et al. | 455/230 |
| 8,611,445 B2 * | 12/2013 | Rajendran et al. | 375/261 |
| 8,620,348 B2 * | 12/2013 | Shrivastava et al. | 455/456.1 |
| 8,676,255 B2 * | 3/2014 | Moelker et al. | 455/553.1 |
| 8,861,635 B2 * | 10/2014 | Wang et al. | 375/267 |
| 8,873,662 B2 * | 10/2014 | Sesia et al. | 375/267 |
| 2008/0012764 A1 * | 1/2008 | Kang et al. | 342/367 |
| 2009/0195453 A1 * | 8/2009 | Kim | 342/373 |

* cited by examiner

*Primary Examiner* — Marceau Milord

(57) ABSTRACT

A re-configurable RF architecture includes both a 2×2 MIMO mode and a 1×2 MIMO mode The 2×2 MIMO mode includes a first RF chain coupled with a first dual band antenna and configured to both transmit (Tx) and receive (Rx) using two different RF protocols. The 2×2 MIMO mode also includes a second RF chain coupled with a second dual band antenna and configured to both Tx and Rx using a single RF protocol. The first RF chain may be coupled with a third antenna configured for near field proximity sensing. The RF architecture is reversibly switchable from the 2×2 MIMO mode to the 1×2 MIMO mode when near field proximity detection is required. In the 1×2 MIMO mode the Tx/Rx capabilities of the second chain using the second dual band antenna are retained and the first chain is configured for Rx only capability using the third antenna.

20 Claims, 12 Drawing Sheets

RF ARCHITECTURE UTILIZING A MIMO CHIPSET FOR NEAR FIELD PROXIMITY SENSING AND COMMUNICATION

CROSS-REFERENCE TO RELATED APPLICATIONS

This application is related to the following applications: U.S. patent application Ser. No. 13/952,532, filed on Jul. 26, 2013, and titled "Radio Signal Pickup From An Electrically Conductive Substrate Utilizing Passive Slits"; U.S. patent application Ser. No. 13/919,307, filed on Jun. 17, 2013, and titled "Determining Proximity For Devices Interacting With Media Devices"; and U.S. patent application Ser. No. 13/802,646, filed on Mar. 13, 2013, and titled "Proximity-Based Control Of Media Devices For Media Presentations"; all of which are hereby incorporated by reference in their entirety for all purposes.

FIELD

These present application relates generally to the field of personal electronics, portable electronics, media presentation devices, audio systems, and more specifically to a RF architecture that is reversibly switchable between a 2×2 MIMO mode and a 1×2 MIMO mode while maintaining dual band RF communications in either mode and receive only near field proximity detection in the 1×2 MIMO mode.

BACKGROUND

MIMO is an abbreviation for Multiple-Input Multiple Output RF devices that have the ability to simultaneously handle multiple RF data inputs and multiple RF data outputs. RF devices that include MIMO capability may use a RF antenna to send and receive more than one communication signal simultaneously. For example, transmitting a WiFi signal using a dual band antenna and receiving a Bluetooth (BT) signal using the same dual band antenna. A 2×2 MIMO architecture may provide two RF paths that use two RF chains with each chain configured for receiving and transmitting a RF signal. A 1×1 MIMO architecture, also called SISO, allows for one RF path with a single RF chain that is capable of transmitting or receiving a RF signal. MIMO systems that use multiple RF antennas can take advantage of multipath effects that result in improved range and capacity due to more reliable signal quality and increased bandwidth.

The MIMO architectures may utilize one or more antennas or a dual band antenna to transmit and receive RF signals. Those antennas are typically optimized for the intended RF bands the MIMO will be in communications with, such as WiFi (2.4 GHz, 5 GHz) and Bluetooth, for example. However, some systems that incorporate a MIMO architecture may include features that requires an antenna optimized for another function, such as near field proximity detection. In some applications, the antenna to be used for near field proximity detection may be subject to design constraints such as imposed by industrial design considerations (e.g., esthetic requirements), chassis/enclosure design, just to name a few. In other applications, the antenna to be used for near field proximity detection may be configured to not be optimized for any of the frequency bands used by the MIMO. For example, it may be desirable to have an intentionally detuned antenna for antenna for near field proximity detection because it will be less sensitive to signal strength (e.g., RSSI) generated by transmitting devices in the far field region (e.g., >0.5 meters from the antenna) and more sensitive to transmitting devices that are in the near field or very near field (e.g., <0.5 meters from the antenna) or are in direct contact with the antenna. Therefore an antenna that is detuned and/or not optimized for RF bands such as those used for WiFi or Bluetooth, may be desirable for some applications that also include a MIMO architecture.

Thus, there is a need for a RF architecture that takes advantage of MIMO while also incorporating antennas optimized for near field proximity detection into the MIMO architecture while maintaining the advantages of the MIMO architecture.

BRIEF DESCRIPTION OF THE DRAWINGS

Various embodiments or examples ("examples") of the present application are disclosed in the following detailed description and the accompanying drawings. The drawings are not necessarily to scale.

DETAILED DESCRIPTION

Various embodiments or examples may be implemented in numerous ways, including as a system, a process, an apparatus, a user interface, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying drawing FIGS. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1A:
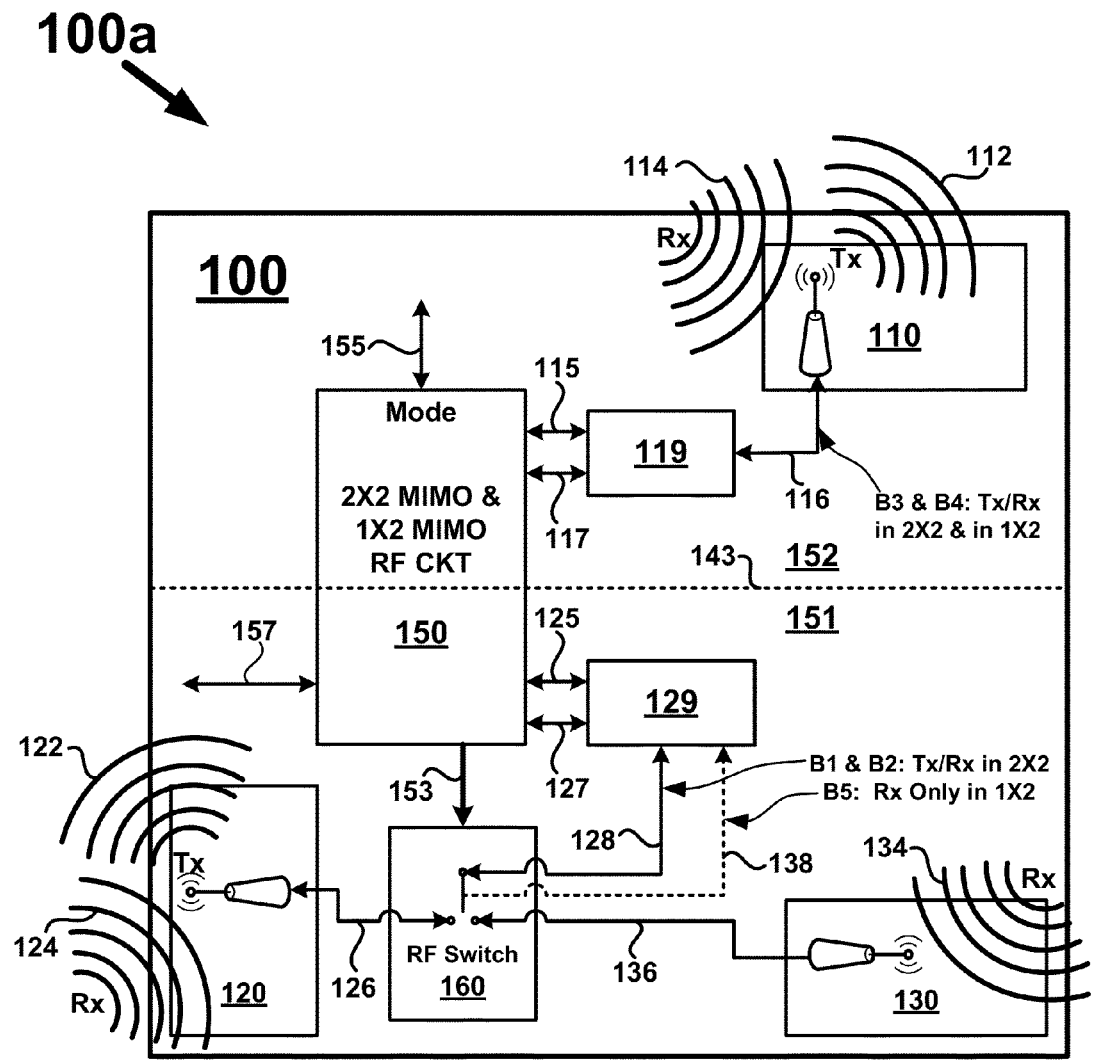
FIG. 1A depicts a block diagram of one example of a RF frontend architecture, according to an embodiment of the present application.

FIG. 1A depicts a block diagram 100a of one example of a RF frontend architecture 100 (RF 100 hereinafter). Unless otherwise stated, elements in RF 100 may be implemented using a variety of technologies including but not limited to an integrated circuit (IC), a mixed-signal IC, an application specific integrated circuit (ASIC), a mixed signal ASIC, discrete electronic components, combinations of discrete electronic components and IC's or ASIC's, just to name a few. RF 100 includes RF circuitry 150 having circuitry for a 2×2 Multiple-Input Multiple-Output (MIMO) and a 1×2 MIMO. One or more signals (e.g., 157, 155), either internal to RF 100, external to RF 100, or both may be used to set a 2×2 MIMO mode or 1×2 MIMO mode. For example, a mode signal 155 received by RF circuitry 150 may be used to determine with of the two MIMO modes is set. As one example, if the mode signal 155 is active high, then the 2×2 MIMO mode is set, and if the mode signal 155 is active low, then the 1×2 MIMO mode is set. In other examples, another signal or group of signals may set the MIMO mode or cause the mode signal 155 to be set to one of the two MIMO modes. For example, one or more signals on port 157 of RF circuitry 150 may be used to set the MIMO state or cause the mode signal 155 to be set to a particular value or voltage level (e.g., logic 1 or logic 0).

RF circuitry 150 may include two separate RF chains and their associated circuitry and antennas. For purposes of explanation, a dashed line 143 will be used to visually demark a first RF chain 151 from a second RF chain 152 so that the functionality of the two RF chains may be described with clarity. In the first RF chain 151, circuitry 129 may be electrically coupled (125, 127) with RF circuitry 150 and a RF switch 160. Connections 125 and 127 may be for ports on RF circuitry 150 that support different RF bands such as 2.4 GHz, 5 GHz, and Bluetooth (BT), for example. Connections 125 and 127 may also be used to couple RF signals such as those associated with antenna 130 as will be described below. RF chain 151 may include two antennas such as antenna 120 and antenna 130, both of which are electrically coupled (126, 136) with RF switch 160. RF switch 160 may select between antennas 120 and 130 based on a signal 153 received by the switch 160 from RF circuitry 150. Antenna 120 may be a dual band antenna or a dual band chip antenna. The dual band chip antenna may be monolithically integrated with a semiconductor die that include some or all of the circuitry in RF 100 and/or RF circuitry 150. The dual band chip antenna may be positioned (e.g., floor planned) at a specific location on the die such as at a corner or a side of the die. There may be multiple dual band chip antennas and those antennas may be positioned at opposing corners of the die or at opposing sides or edges, for example. Antenna 130 may be an antenna specifically configured for near field detection of external sources of RF signals. For example, antenna 130 may be a near field proximity detection antenna configured to generate a RF signal when a transmitting RF device is placed directly on or in contact with antenna 130, or positioned in near field proximity or very close near field proximity of antenna 130. Very close near field proximity may comprise a distance from the antenna 130 that is approximately 0.5 meters or less. More preferably, 50 mm or less. Even more preferably, 30 mm or less. Near field proximity may comprise a distance that is greater than 0.5 meters. The foregoing are non-limiting examples of what may define near field proximity or very close near field proximity and actual values will be application dependent. Antenna 130 may be configured to be intentionally detuned (e.g., to a lower frequency) from a target frequency, such as the frequency or frequencies of the external sources of RF signals and/or one or more of the dual band frequencies of RF 100. For example, if the target frequency is 2.4 GHz, then antenna 130 may be detuned to a lower frequency that may be approximately in a range from about 0.5 GHz to about 1.0 GHz. Antenna 130 will be described in greater detail below. Examples of target frequencies include but are not limited to: 2.4 GHz; 2.4 GHz-2.48 GHz; from about 2.4 GHz to about 2.48 GHz; 5 GHz; unlicensed bands, licensed bands, cellular bands, bands used by 2G, 3G, 4G, and 5G devices, Bluetooth bands, any of the 802.11 bands, military bands, just to name a few. Antenna 130 may be tuned to the target frequency or in some examples may be detuned to a frequency range that is below that (i.e., lower) of the target frequency or to a frequency range that is above (i.e., greater) that of the target frequency.

RF chain 152 includes circuitry 119 that may be electrically coupled (115, 117) with RF circuitry 150. Connections 115 and 117 may be for ports on RF circuitry 150 that support different RF bands such as 2.4 GHz, 5 GHz, and Bluetooth (BT), for example. RF chain 152 may include an antenna 110 that may be a dual band antenna or a dual band chip antenna as described above for antenna 120. RF circuitry 150 may support multiple MIMO modes, such as a 2×2 MIMO mode and a 1×2 MIMO mode and RF circuitry 150 may reversibly switch between the multiple MIMO modes, such as between 2×2 MIMO and 1×2 MIMO modes (e.g., in response to signal 155 and/or 157). When the 2×2 MIMO mode is set, RF circuitry 150 is configured for dual band RF communication for both transmit (Tx) and receive (Rx) using both antennas (110, 120). Moreover, the dual band RF communications may occur simultaneously such that RF chain 151 may use its antenna 120 to Tx/Rx on dual RF bands, such as WiFi 2.4 GHz and/or WiFi 5 GHz or Bluetooth and/or WiFi 5 GHz. Similarly, RF chain 152 may use its antenna 110 to Tx/Rx on dual RF bands, such as WiFi 2.4 GHz and/or WiFi 5 GHz or Bluetooth and/or WiFi 5 GHz. RF circuitry 150 may be configured so both of the RF chains (151, 152) may Tx/Rx using Bluetooth, or only one of the RF chains (151, 152) may Tx/Rx using Bluetooth (e.g., BT on RF chain 152 only). Ports 115, 117, 125, and 127 may be configured for different frequency bands. For example, ports 115 and 125 may be assigned for a RF band such as 2.4 GHz, and ports 117 and 127 may be assigned to another RF band such as 5 GHz. In some applications, all of the ports (115, 117, 125, and 127) may be simultaneously Tx/Rx RF signals over their respective RF bands and in other application some or all of the ports (115, 117, 125, and 127) may be idle. Actual port traffic may be determined by a system or device that incorporates RF 100.

2×2 MIMO Mode

Figure 1B:
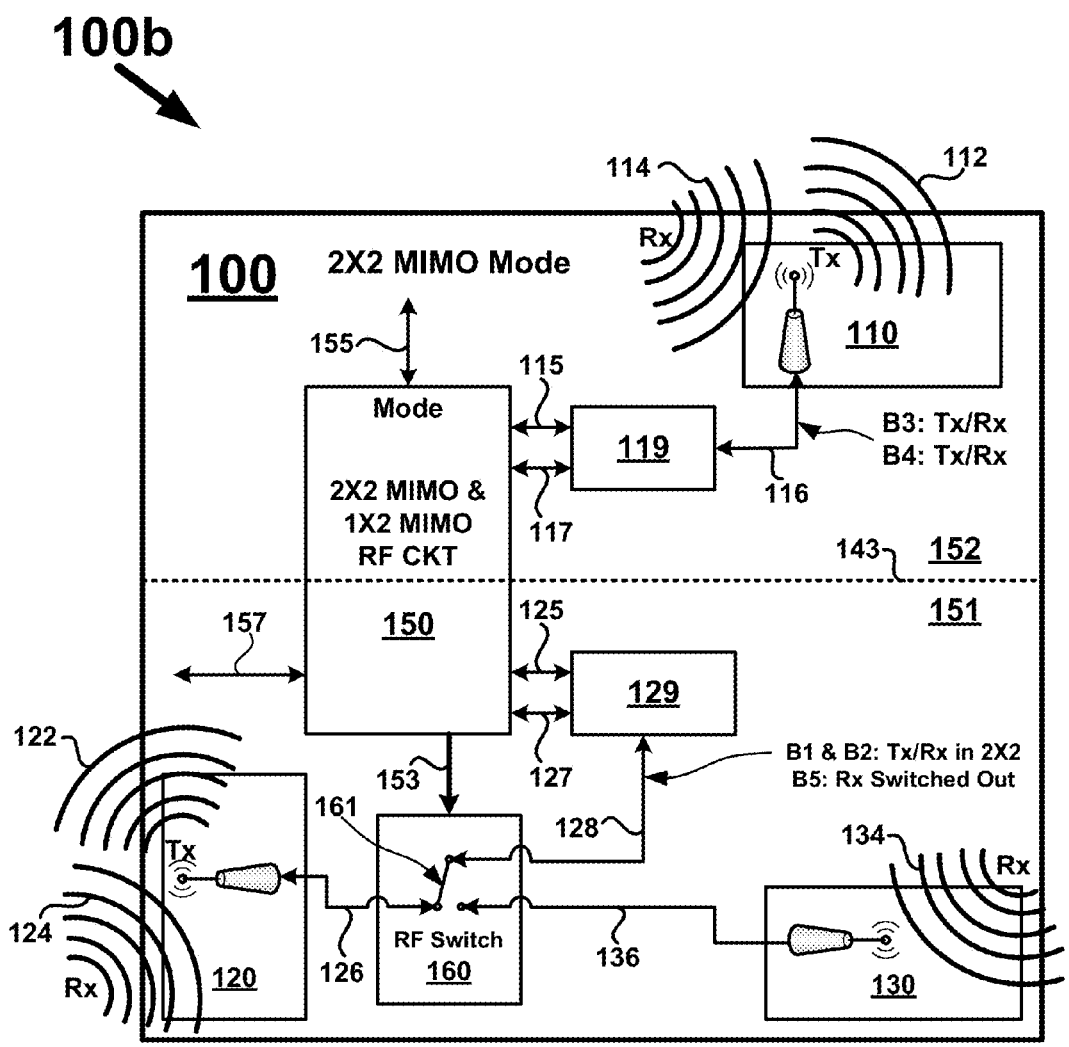
FIG. 1B depicts a block diagram of the RF frontend architecture of FIG. 1A when set to a 2×2 MIMO mode, according to an embodiment of the present application.

In FIGS. 1A and 1B, for purposes of explanation, assume mode signal 155 is set to the 2×2 MIMO mode. In the 2×2 MIMO mode, RF switch 160 electrically couples 161 the antenna 120 with circuitry 129 and dual bandwidth RF communication using antenna 120 is enabled such that dual RF bands denoted as B1 and B2 may both simultaneously Tx 122 and Rx 124 RF signals via electrical coupling 128 between circuitry 129 and antenna 120. Here B1 may be associated with port 125 and B2 with port 127. While in the 2×2 MIMO mode, antenna 130 is electrically decoupled from circuitry 129 by switch 160. Antenna 130 may be tuned to a fifth RF signal denoted as Rx 134. However, in the 2×2 MIMO mode, if Rx 134 is incident on antenna 130, then a resulting signal is not electrically coupled 136 with circuitry 129 because RF switch 160 is set to electrically couple 161 with antenna 120 thereby switching out B5 for Rx 134. Furthermore, while in the 2×2 MIMO mode the circuitry 119 is electrically coupled with antenna 110 and dual RF bands denoted as B3 and B4 may both simultaneously Tx 112 and Rx 114 RF signals via electrical coupling 116 between circuitry 119 and antenna 110. Therefore, four RF bands (B1-B4) may be active for Tx and Rx in the 2×2 MIMO mode and RF signal reception over B5 is blocked because antenna 130 is switched out.

1×2 MIMO Mode

Figure 1C:
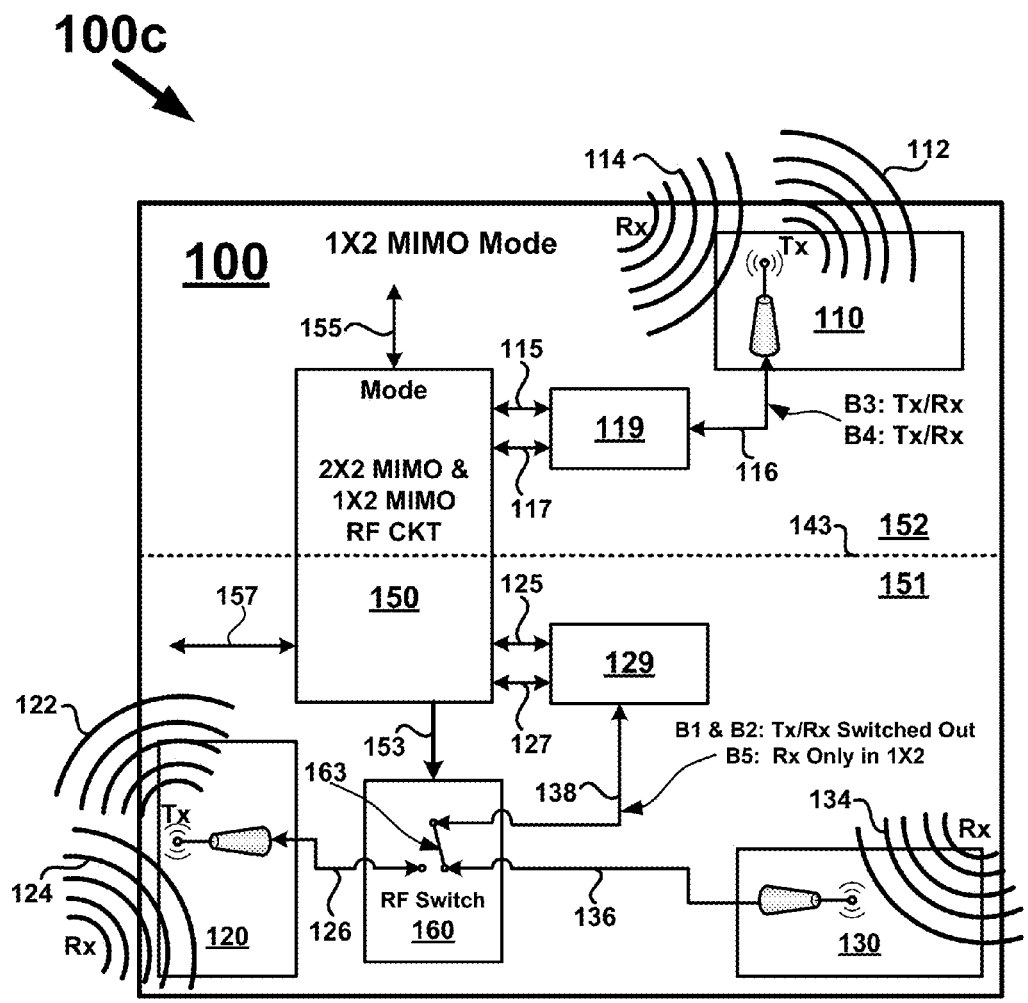
FIG. 1C depicts a block diagram of the RF frontend architecture of FIG. 1A when set to a 1×2 MIMO mode, according to an embodiment of the present application.

Moving now to FIG. 1C, for purposes of explanation, assume mode signal 155 is set to the 1×2 MIMO mode. In the 1×2 MIMO mode, RF switch 160 electrically couples 163 the antenna 130 with circuitry 129 and dual bandwidth RF communication (B1, B2) using antenna 120 is disabled because the antenna 120 is switched out. Here, when antenna 130 has Rx 134 incident on it a signal may be electrically communicated (136, 138) to circuitry 129 and that signal may be processed by RF circuitry 150 or other. The processing may be used to determine relative signal strength based on the signal, or to make received signal strength indicator (RSSI) measurements based on the signal. Furthermore, while in the 1×2 MIMO mode the circuitry 119 is electrically coupled with antenna 110 and dual RF bands (B3, B4) and both bands may simultaneously Tx 112 and Rx 114 RF signals via electrical coupling 116 between circuitry 119 and antenna 110. Therefore, two RF bands (B3-B4) may be active for Tx and Rx in the 1×2 MIMO mode in RF chain 152 and RF signals may be received only in RF chain 151 via antenna 130. Tx and Rx over B1 and B2 is blocked in the 1×2 MIMO mode because antenna 120 is switched out.

Figure 1D:
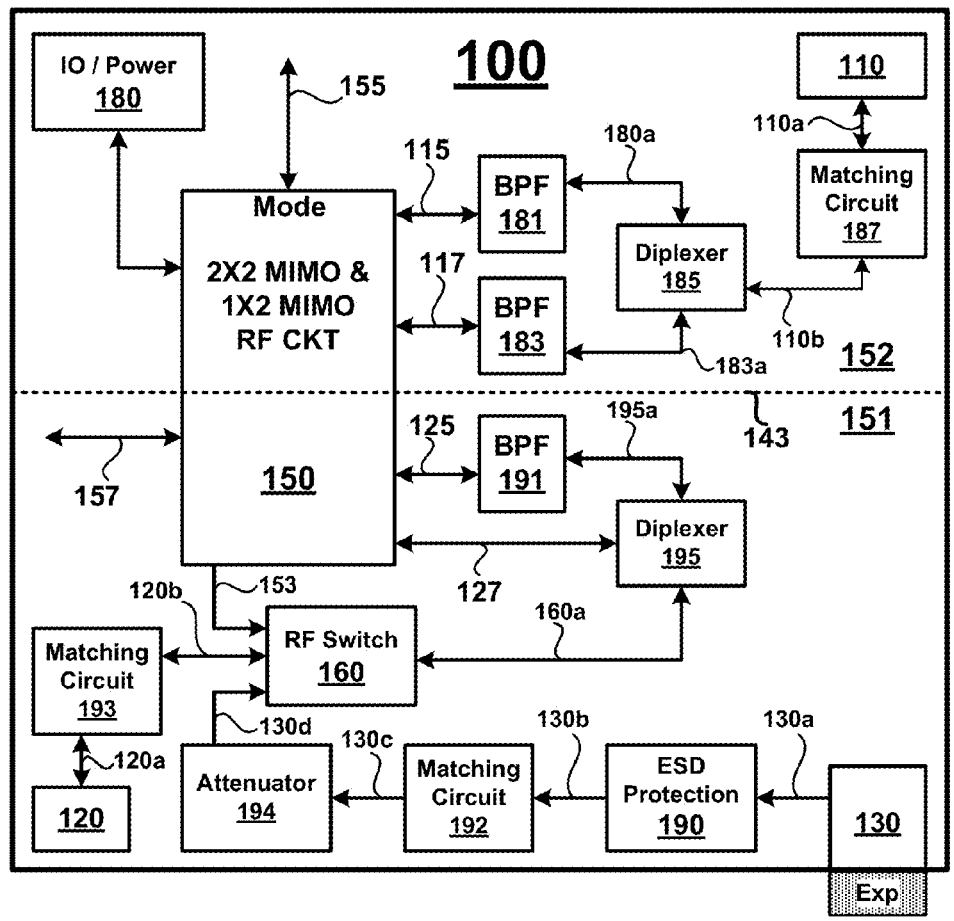
FIG. 1D depicts a more detailed block diagram of one example of a RF frontend architecture, according to an embodiment of the present application.

FIG. 1D depicts a more detailed block diagram 100d of one example of RF 100. In RF chain 151, circuitry 129 may include a band pass filter (BPF) 191 coupled (125, 195a) with the RF circuitry 150 and a diplexer 195. Diplexer 195 may be electrically coupled 160a with an output of RF switch 160. A matching circuit 193 may be electrically coupled (120a, 120b) with antenna 120 and an input to RF switch 160. At least a portion of antenna 130 may be exposed (Exp) (see FIGS. 4A-4E) to facilitate near field detection of external RF transmitting devices (e.g., a smartphone, tablet, or pad). Additional circuitry may include an electrostatic discharge (ESD) protection circuit 190, a matching circuit 192, and an attenuator 194 electrically coupled (130d, 130c, 130b, and 130a) between the antenna 130 and RF switch 160. In RF chain 152, BPF's 181 and 183 may be electrically coupled (115, 117, 180a, and 180b) between a diplexer 185 and RF circuitry 150, and a matching circuit 187 may be electrically coupled (110a, 110b) between the diplexer 185 and antenna 110.

Figure 1E:
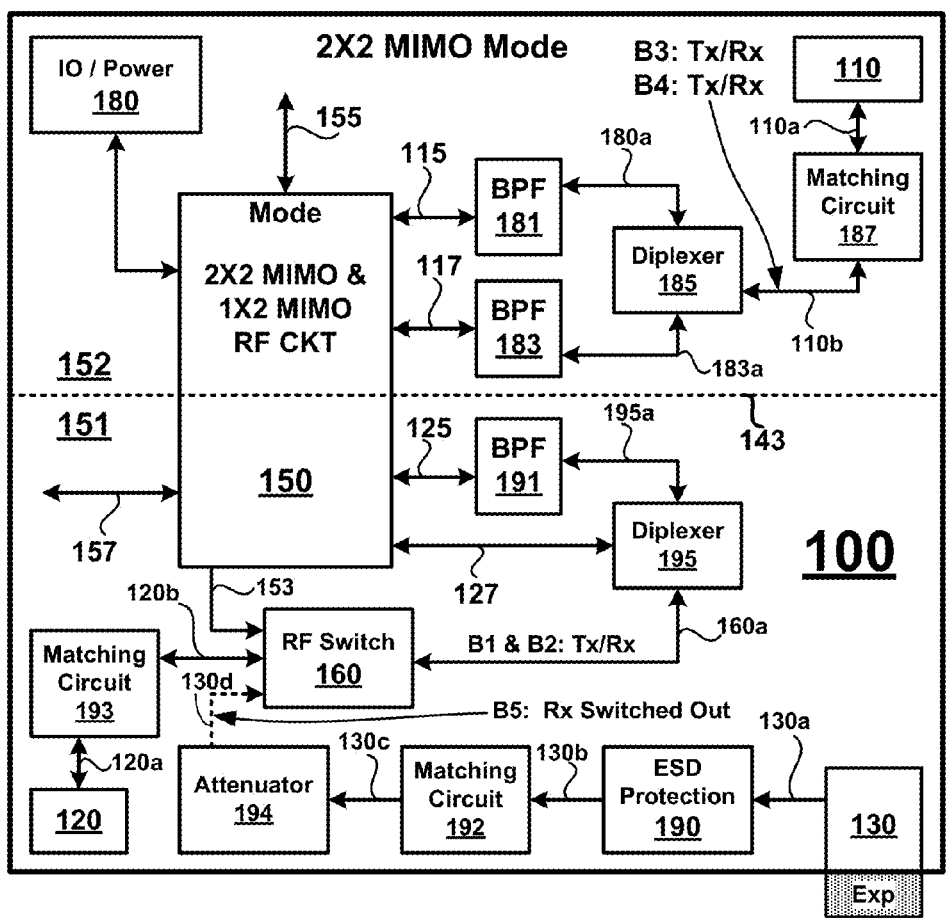
FIG. 1E depicts a block diagram of the RF frontend architecture of FIG. 1D when set to a 2×2 MIMO mode, according to an embodiment of the present application.

In FIG. 1E, setting the mode signal to the 2×2 MIMO mode is operative to generate a signal on 153 that causes RF switch 160 to deselect antenna 130 for B5 (e.g., Rx on B5 is switched out) as denoted by a dashed line for input 130d to RF switch 160, and to select antenna 120 as denoted by a solid line for input 120b. Therefore, in the 2×2 MIMO mode, B5 is blocked and B1, B2, B3 and B4 are all available for Tx/Rx in RF chains 151 and 152.

Figure 1F:
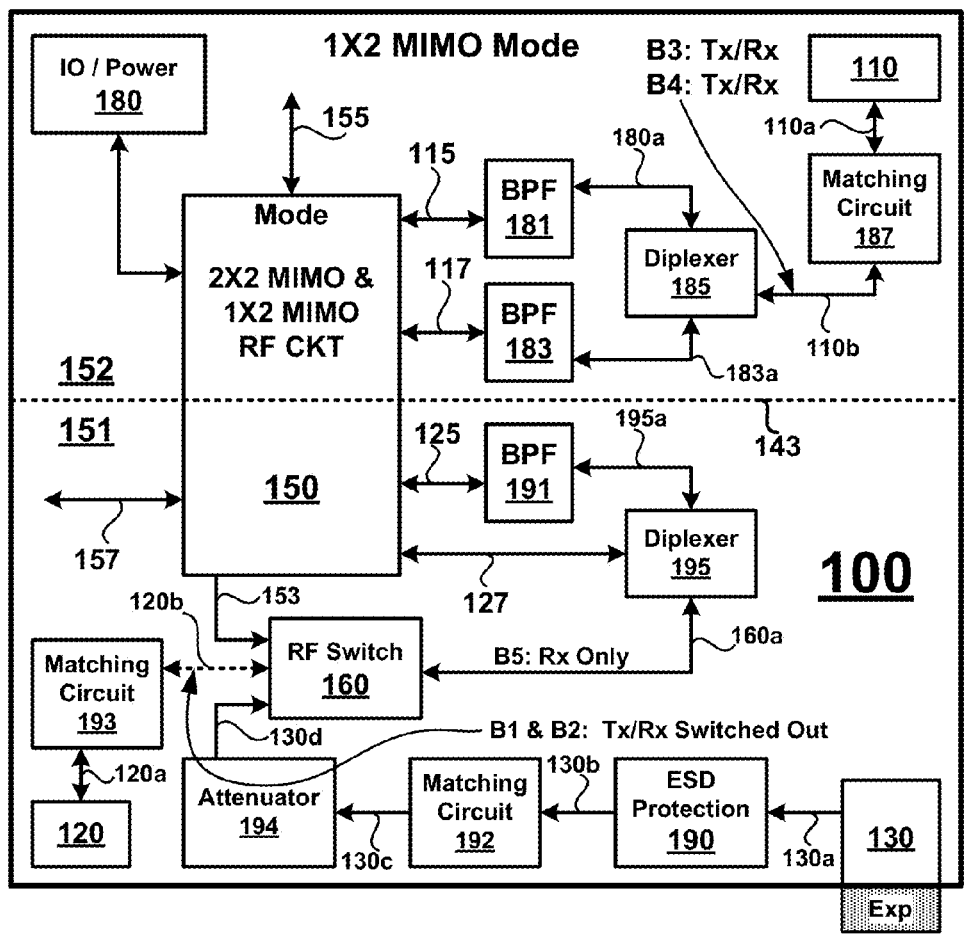
FIG. 1F depicts a block diagram of the RF frontend architecture of FIG. 1D when set to a 1×2 MIMO mode, according to an embodiment of the present application.

In FIG. 1F, setting the mode signal to the 1×2 MIMO mode is operative to generate a signal on 153 that causes RF switch 160 to deselect antenna 120 thereby switching out Tx/Rx on B1 and B2 as denoted by a dashed line for input 120b to RF switch 160. Antenna 120 is selected as denoted by a solid line for input 130d to RF switch 160. Therefore, in the 2×2 MIMO mode, B5 is available for Rx only, B1 and B2 are blocked for both Tx and Rx, and B3 and B4 in RF chain 152 are both available for Tx and Rx.

Figure 2:
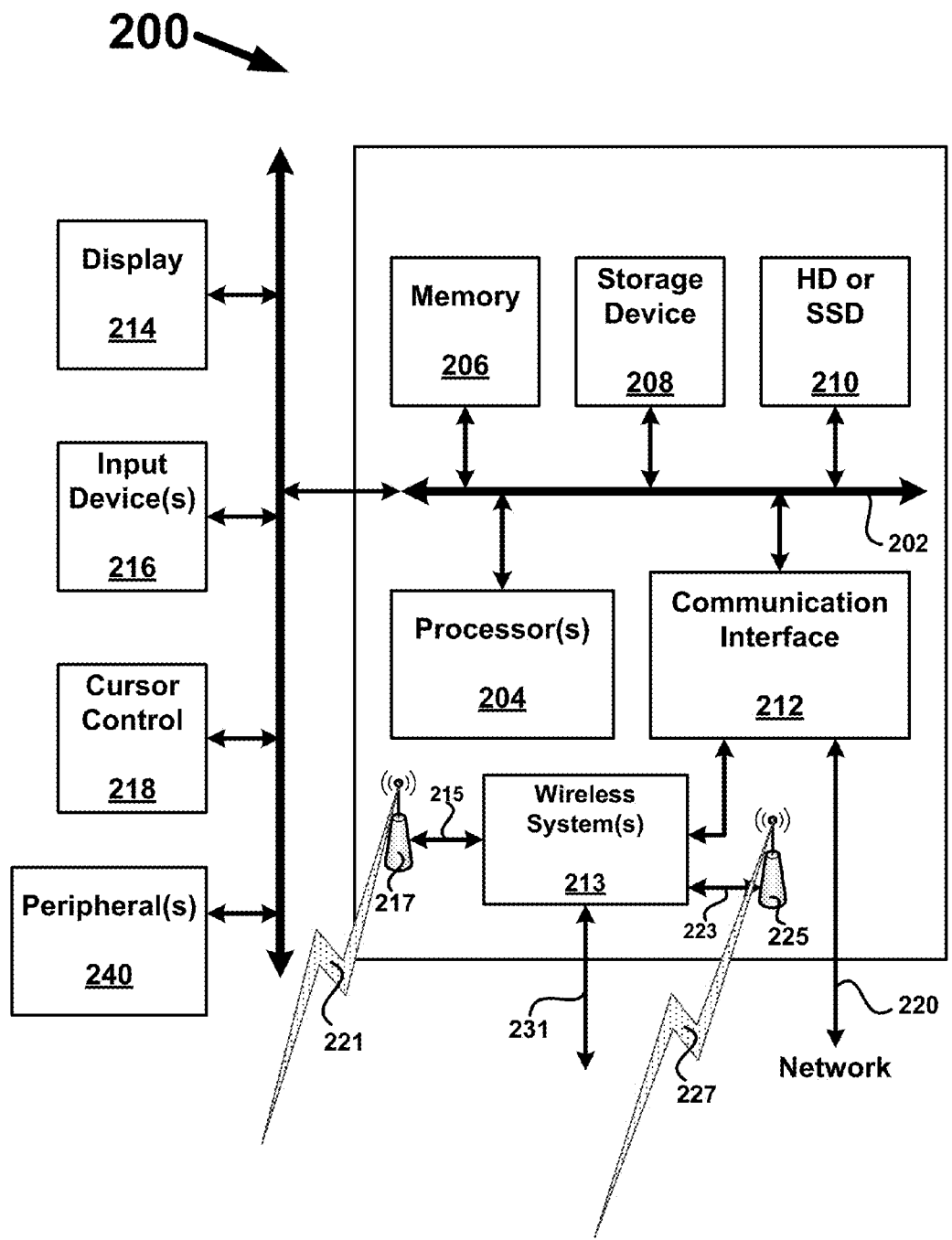
FIG. 2 depicts an exemplary computer system according to an embodiment of the present application.

FIG. 2 depicts an exemplary computer system 200 suitable for use in the systems, methods, and apparatus described herein. In some examples, computer system 200 may be used to implement circuitry, computer programs, applications (e.g., APP's), configurations (e.g., CFG's), methods, processes, or other hardware and/or software to perform the above-described techniques. Computer system 200 includes a bus 202 or other communication mechanism for communicating information, which interconnects subsystems and devices, such as one or more processors 204, system memory 206 (e.g., RAM, SRAM, DRAM, Flash), storage device 208 (e.g., Flash, ROM), disk drive 210 (e.g., magnetic, optical, solid state), communication interface 212 (e.g., modem, Ethernet, WiFi), display 214 (e.g., CRT, LCD, touch screen), one or more input devices 216 (e.g., keyboard, stylus, touch screen display), cursor control 218 (e.g., mouse, trackball, stylus), one or more peripherals 240. Some of the elements depicted in computer system 200 may be optional, such as elements 214-218 and 240, for example and computer system 200 need not include all of the elements depicted.

According to some examples, computer system 200 performs specific operations by processor 204 executing one or more sequences of one or more instructions stored in system memory 206. Such instructions may be read into system memory 206 from another non-transitory computer readable medium, such as storage device 208 or disk drive 210 (e.g., a HD or SSD). In some examples, circuitry may be used in place of or in combination with software instructions for implementation. The term "non-transitory computer readable medium" refers to any tangible medium that participates in providing instructions to processor 204 for execution. Such a medium may take many forms, including but not limited to, non-volatile media and volatile media. Non-volatile media includes, for example, optical, magnetic, or solid state disks, such as disk drive 210. Volatile media includes dynamic memory, such as system memory 206. Common forms of non-transitory computer readable media includes, for example, floppy disk, flexible disk, hard disk, SSD, magnetic tape, any other magnetic medium, CD-ROM, DVD-ROM, Blu-Ray ROM, USB thumb drive, SD Card, any other optical medium, punch cards, paper tape, any other physical medium with patterns of holes, RAM, PROM, EPROM, FLASH-EPROM, any other memory chip or cartridge, or any other medium from which a computer may read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 202 for transmitting a computer data signal. In some examples, execution of the sequences of instructions may be performed by a single computer system 200. According to some examples, two or more computer systems 200 coupled by communication link 220 (e.g., LAN, Ethernet, PSTN, or wireless network) may perform the sequence of instructions in coordination with one another. Computer system 200 may transmit and receive messages, data, and instructions, including programs, (i.e., application code), through communication link 220 and communication interface 212. Received program code may be executed by processor 204 as it is received, and/or stored in a drive unit 210 (e.g., a SSD or HD) or other non-volatile storage for later execution. Computer system 200 may optionally include one or more wireless systems 213 in communication with the communication interface 212 and coupled (215, 223) with one or more antennas (217, 225) for receiving and/or transmitting RF signals (221, 227), such as from a WiFi network, BT radio, or other wireless network and/or wireless devices, for example. Examples of wireless devices include but are not limited to: a data capable strap band, wristband, wristwatch, digital watch, or wireless activity monitoring and reporting device; a smartphone; cellular phone; tablet; tablet computer; pad device (e.g., an iPad); touch screen device; touch screen computer; laptop computer; personal computer; server; personal digital assistant (PDA); portable gaming device; a mobile electronic device; and a wireless media device, just to name a few. Computer system 200 in part or whole may be used to implement one or more systems, devices, or methods using the antenna and passive slits as described herein. For example, a radio (e.g., a RF receiver) in wireless system(s) 213 may be electrically coupled 231 with an edge of the antenna. Computer system 200 in part or whole may be used to implement a remote server or other compute engine in communication with systems, devices, or method using the antenna and passive slits as described herein. RF 100 may be included in the wireless system(s) 213.

Figure 3:
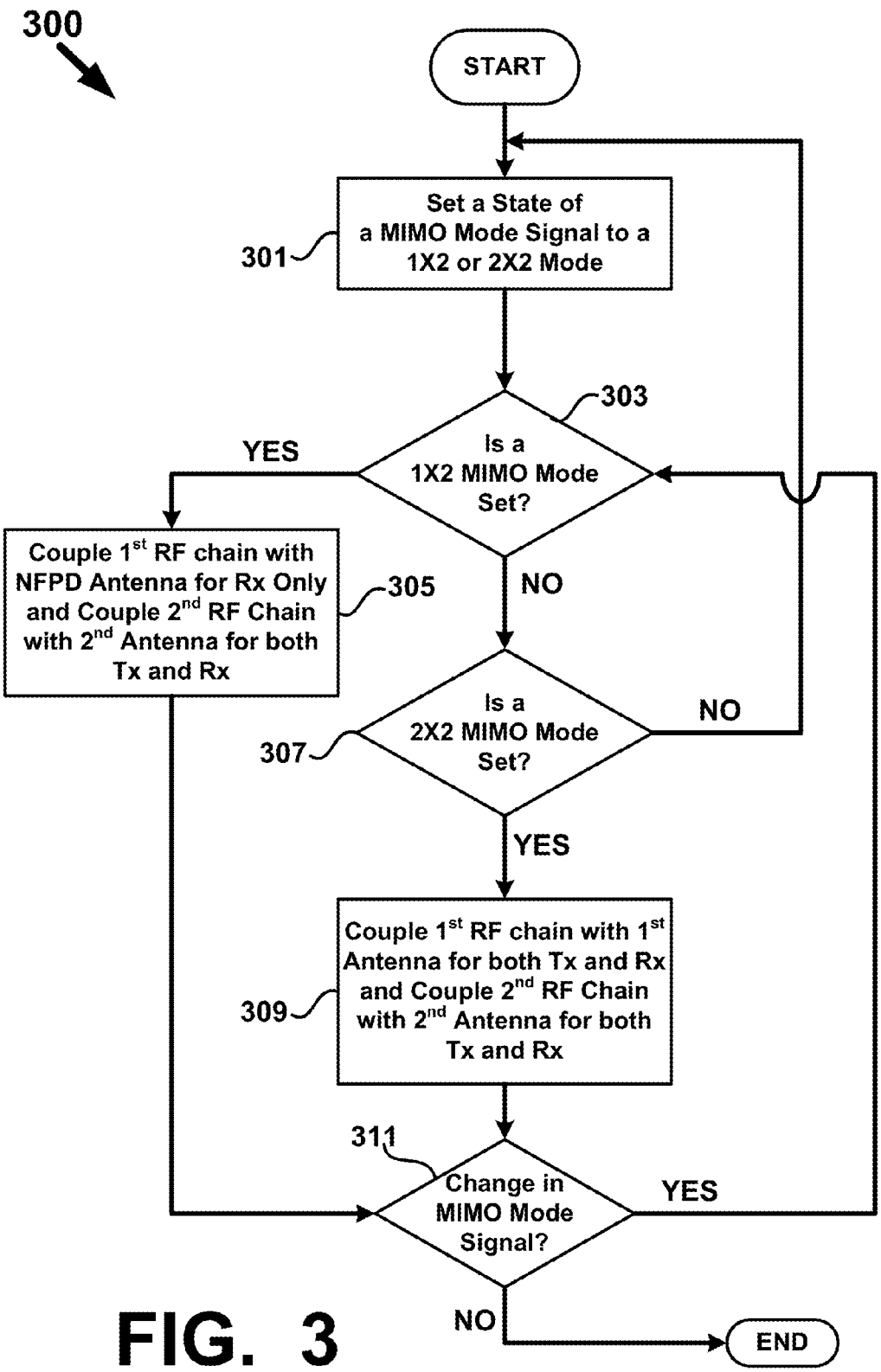
FIG. 3 depicts a flow diagram of one example of a method for multi-channel dual band wireless communication and wireless near field proximity detection, according to an embodiment of the present application.

FIG. 3 depicts a flow diagram 300 of one example a method for multi-channel dual band wireless communication and wireless near field proximity detection. At a stage 301 a state of a MIMO mode signal (e.g., mode 153) is set to a 1×2 MIMO mode or a 2×2 MIMO mode. An external signal may be used to set and/or toggle a state of the MIMO mode signal. As one example, a user pressing or otherwise actuating a switch, button, capacitive switch, touch screen, or other device may trigger the generation and/or toggling of the MIMO mode signal. At a stage 303 a determination may be made as to whether or not the MIMO mode signal is set to a 1×2 MIMO mode. If the state of the MIMO mode signal is set to the 1×2 MIMO mode, then a YES branch is taken to a stage 305 where the RF chain 151 couples the antenna 130 for Rx only on B5 and RF chain 152 couples antenna 110 for both Tx and Rx on B3 and B4. At a stage 311 a determination may be made as to whether or not the MIMO mode signal has changed since being set to the 1×2 MIMO mode. If the MIMO mode signal has not changed, then a NO branch may be taken and flow 300 may end. If the MIMO mode signal has changed, then a YES branch may return flow back to a prior stage, such as the stage 303, for example.

Back at the stage 303, if the 1×2 MIMO mode has not been set, then a NO branch may be taken to a stage 307 where a determination may be made as to whether or not the MIMO mode signal is set to a 2×2 MIMO mode. If the state of the MIMO mode signal is set to the 2×2 MIMO mode, then a YES branch is taken to a stage 309 where the RF chain 151 couples antenna 120 for Tx and Rx on B1 and B2, antenna 130 is decoupled so that Rx on B5 is blocked, and RF chain 152 couples antenna 110 for both Tx and Rx on B3 and B4. If the 2×2 MIMO mode is not set, then a NO branch may be taken and the flow 300 may return to a prior stage, such as the stage 301, for example. At the stage 311, the flow 300 may end if there is no change in the MIMO mode signal or may flow back to a prior stage, such as the stage 303, for example.

Table 1 below lists examples of which bands (B1-B5) may Tx or Rx depending on the state of the MIMO mode signal.

TABLE 1

| Band | 2 × 2 MIMO Mode | 1 × 2 MIMO Mode |
| --- | --- | --- |
| B1 | Tx and Rx on 120 | NO Tx or Rx on 120 |
| B2 | Tx and Rx on 120 | NO Tx or Rx on 120 |
| B3 | Tx and Rx on 110 | Tx and Rx on 110 |
| B4 | Tx and Rx on 110 | Tx and Rx on 110 |
| B5 | NO Rx on 130 | Rx only on 130 |

Table 2 below lists examples of frequencies for bands (B1-B5) depending on the state of the MIMO mode signal.

TABLE 2

| Band | 2 ×2 MIMO Mode | 1 × 2 MIMO Mode |
| --- | --- | --- |
| B1 | 2.4 GHz WiFi on 120 | NO Tx or Rx on 120 |
| B2 | 5 GHz WiFi on 120 | NO Tx or Rx on 120 |
| B3 | 2.4 GHz WiFi on 110 | 2.4 GHz WiFi on 110 |
| B4 | 5 GHz WiFi on 110 | 5 GHz WiFi on 110 |
| B1 | BT on 120 | NO Tx or Rx on 120 |
| B2 | 5 GHz WiFi on 120 | NO Tx or Rx on 120 |
| B3 | BT on 110 | BT on 110 |
| B4 | 5 GHz WiFi on 110 | 5 GHz WiFi on 110 |
| B5 | NO Rx on 130 | Rx** only on 130 |

Although Table 2 lists both B1 and B3 as being enabled for Bluetooth Tx and Rx, as was stated above, in some configurations, both B1 and B3 may Tx and Rx using Bluetooth, and in other configurations only B1 or B3 may Tx and Rx using Bluetooth. In some configurations B1, B3, or both may switch between Tx and Rx on 2.4 GHz WiFi to Tx and Rx on Bluetooth as needed. For example, in 2×2 MIMO mode, B1 may initially Tx and Rx over 120 using 2.4 GHz WiFi and then switch to Tx and Rx on Bluetooth when a BT enabled device is paired with or otherwise establishes a BT communications link with RF 100. While B1 continues to Tx and Rx on Bluetooth in the 2×2 MIMO mode, B3 may service the Tx and Rx 2.4 GHz WiFi traffic until B1 again becomes available for 2.4 GHz WiFi communications. The "**" in the column for 1×2 MIMO mode for B5 denotes that antenna 130 may be detuned for optimal performance at some frequency that is lower than those for (B1-B4) as described above.

Antenna Using Passive Slits

Figure 4A:
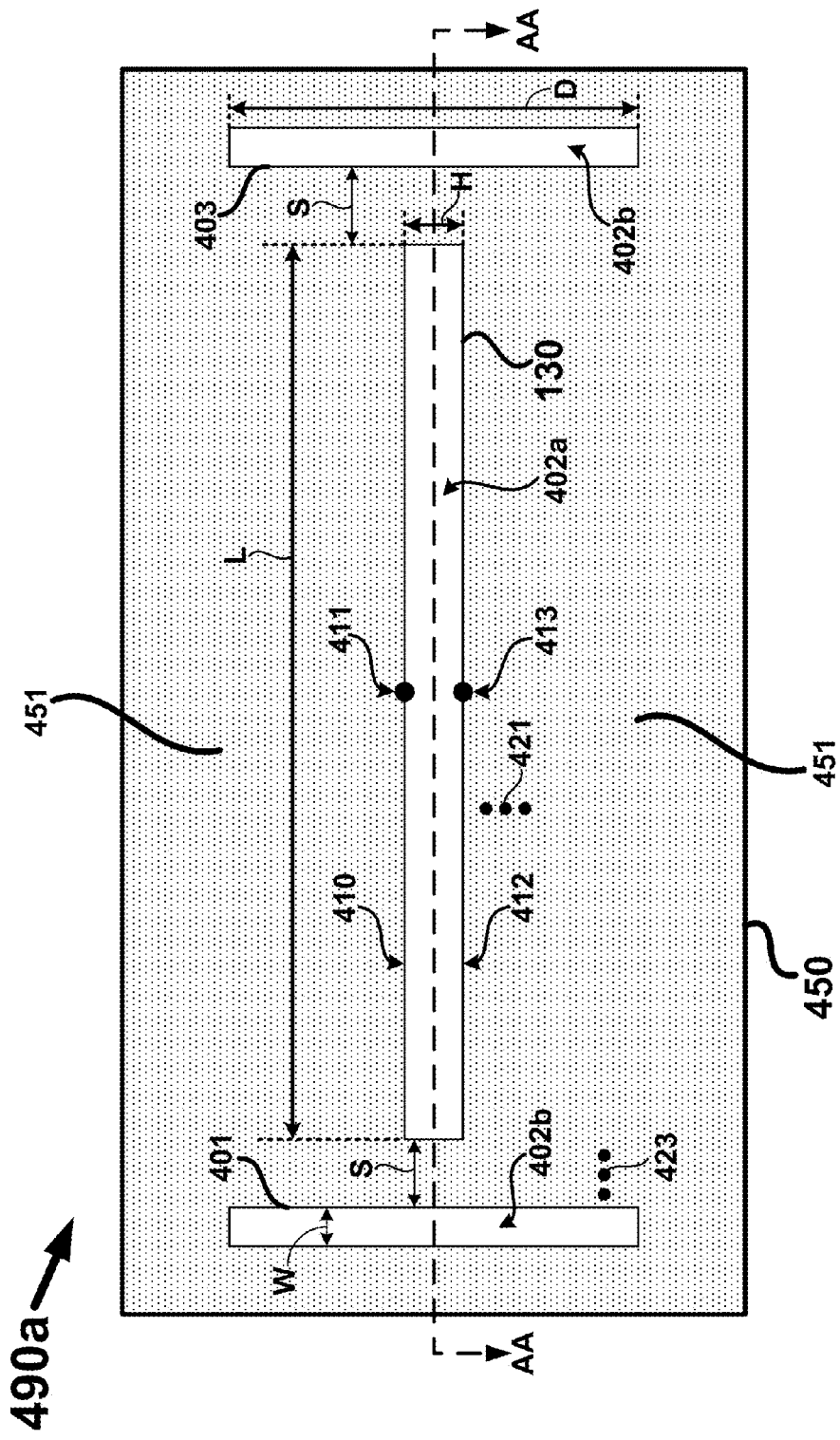
FIG. 4A depicts a top plan view of one example of an antenna and passive slits formed in a substrate of an electrically conductive material, according to an embodiment of the present application.

FIG. 4A depicts a top plan view 490a of a substrate of an electrically conductive material 450 in which a plurality of separate apertures (e.g., holes or openings) are formed. Here, those separate apertures are depicted looking down on a surface 451 of the substrate 450. Therefore, the separate apertures may be described as through holes formed in the substrate 450 and extending all the way through the substrate 450 as will be described in greater detail in FIG. 4B.

One or more of the separate apertures comprises an antenna 130 having a length dimension L that is substantially larger that a width dimension H. For example, if antenna 130 has the shape of a rectangle as depicted in FIG. 4A, then H is much less than L (e.g., H<<L), such that if L is 150 mm then H may be 10 mm or less (e.g., H=3.5 mm). Actual shapes and dimensions of the antenna 130 may be application dependent and are not limited to the configuration depicted in FIG. 4A or in any other figures herein. One edge 410 of antenna 130 is electrically coupled with a radio frequency (RF) system (e.g., RF 100) and an opposite edge 412 is electrically coupled with a ground potential (not shown) (e.g., a ground—GND or chassis ground). Edges 410 and 412 are along a length dimension of the antenna 130. As one example, a node 411 on edge 410 may be electrically coupled with the RF system and another node 413 on the opposite edge 412 may be electrically coupled with the ground potential. In some examples, the electrical connections for nodes 411 and 413 may be reversed and node 413 electrically coupled with the RF system and node 411 electrical coupled with the ground potential. Although the position of the electrical connections to the edges 410 and 412 are depicted directly opposite each other, that is node 411 is directly opposite node 413, the nodes may be positioned along their respective edges at other locations and the configuration depicted is a non-limiting example. Although one antenna 130 is depicted there may be a plurality of antennas as denoted by 421.

Substrate 450 also includes one or more apertures that define a passive slit denoted as 401 and 403. Although two passive slits (401, 403) are depicted there may be just a single passive slit or more than two passive slits as denoted by 423. Moreover, the relative position on the substrate 450 of the passive slit(s) and the antenna(s) are not limited to the configurations depicted in FIG. 4A or in other figures herein and the actual size, shape, dimensions, and positions of the passive slit(s) and/or antenna(s) may be application dependent. Passive slits (401, 403) are not electrically coupled with circuitry, the ground potential, or the RF system. Passive slits (401, 403) are passive structures formed in the substrate 450 and may operate to modify current flow along substrate 450 generated by interaction of an external RF signal (e.g., Rx 134) with antenna 130 as will be described below. Passive slits (401, 403) are not driven by circuitry nor do they generate a signal that is coupled with circuitry (e.g., circuitry in RF 100).

Typically, dimensions of the passive slits (401, 403) may be much less than similar dimensions of the antenna 130. For example, if the passive slits (401, 403) are rectangular in shape as depicted in FIG. 4A, then a width dimension W of passive slits (401, 403) may be less than the width dimension H of the antenna 130. For example, if H is 5 mm, then W may be 1.5 mm. Moreover, if the length L of the antenna 130 is 150 mm then length D may be 53 mm for the passive slits (401, 403). Passive slits (401, 403) may be placed at various positions along surface 451 of substrate 450, such as opposite ends of antenna 130, for example. In that the plurality of apertures are spatially separate from one another, passive slits (401, 403) may be spaced apart from antenna 130 by a distance S that may be the same or different for each passive slit (401, 403).

In that the antenna 130 and passive slits (401, 403) are apertures formed in substrate 450, a void in the opening defined by the apertures, denoted as 402a for the antenna 130 and 402b for the passive slits (401, 403), may be occupied by air or some other electrically non-conductive material, medium, dielectric material, or composition of matter. Examples of suitable materials includes but is not limited to rubber, plastics, glass, wood, stone, a gas, paper, inert organic or inorganic materials, cloth, leather, a liquid, Teflon, PVDF, minerals, just to name a few. A material that occupies the void/opening may be selected for a functional purpose, an esthetic purpose, or both. In some applications a functional element such as a switch, button, actuator, indicator (e.g., a LED), microphone, transducer, or the like may be positioned in void/opening (402a, 402b). In other applications the material disposed in the void/opening (402a, 402b) may include a logo, a trademark, a service mark, ASCII characters, graphics, patterns, one or more esthetic features, instructions, or the like.

Figure 4B:
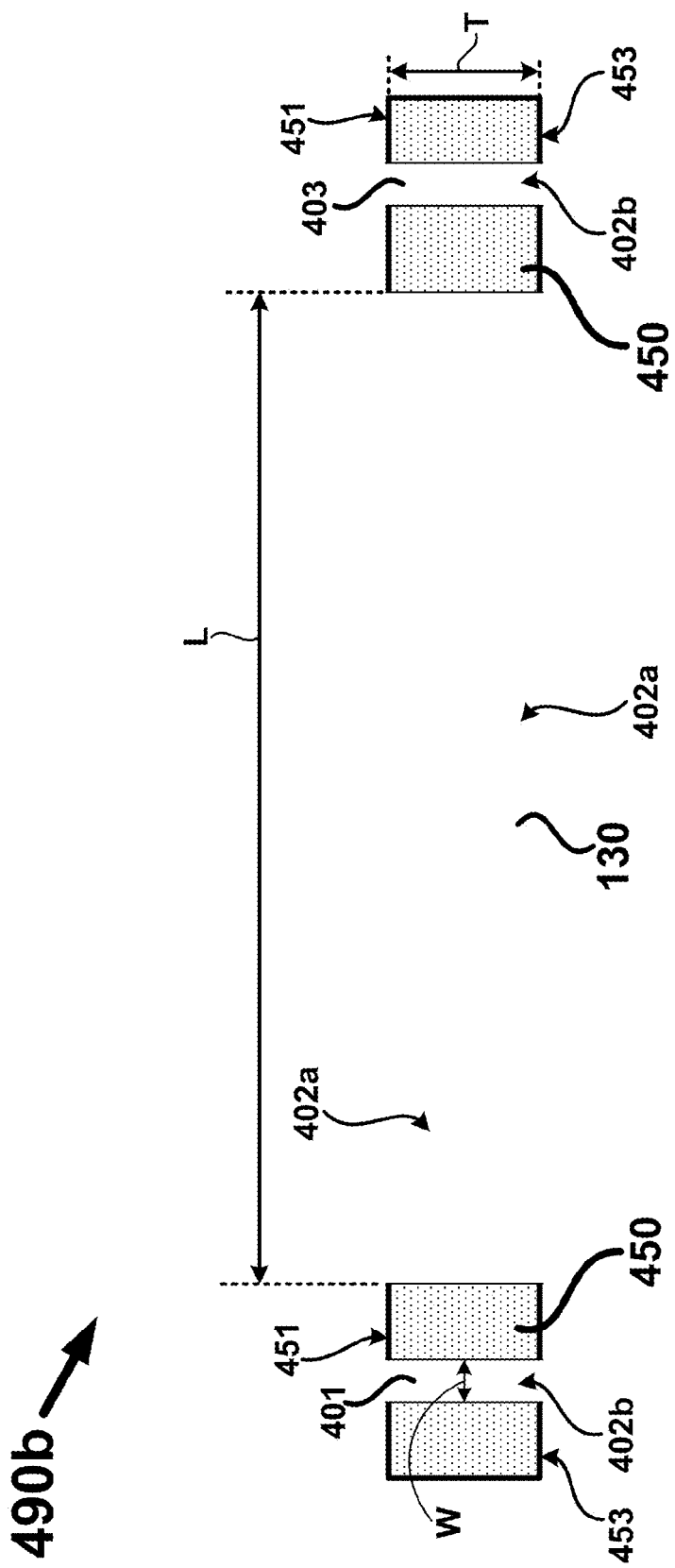
FIG. 4B depicts a cross-sectional view along line AA-AA of FIG. 4A of an antenna and passive slits formed in a substrate of an electrically conductive material, according to an embodiment of the present application.

Moving on to FIG. 4B, a cross-sectional view 490b of the substrate 450 depicts in greater detail the void/opening (402a, 402b) of the apertures for antenna 130 and passive slits (401, 403). Surfaces 451 and 453 of substrate 450 are depicted as being substantially parallel to each other; however, substrate 450 may have a thickness T that varies and need not be flat, planar, or smooth. Moreover, substrate 450 may have a shape including but not limited to an arcuate shape, curvilinear shape, an undulating shape, and a complex shape, just to name a few. Substrate 450 may be made from a perforate material such as a screen, mesh, or other material with perforations formed in it.

Figure 4C:
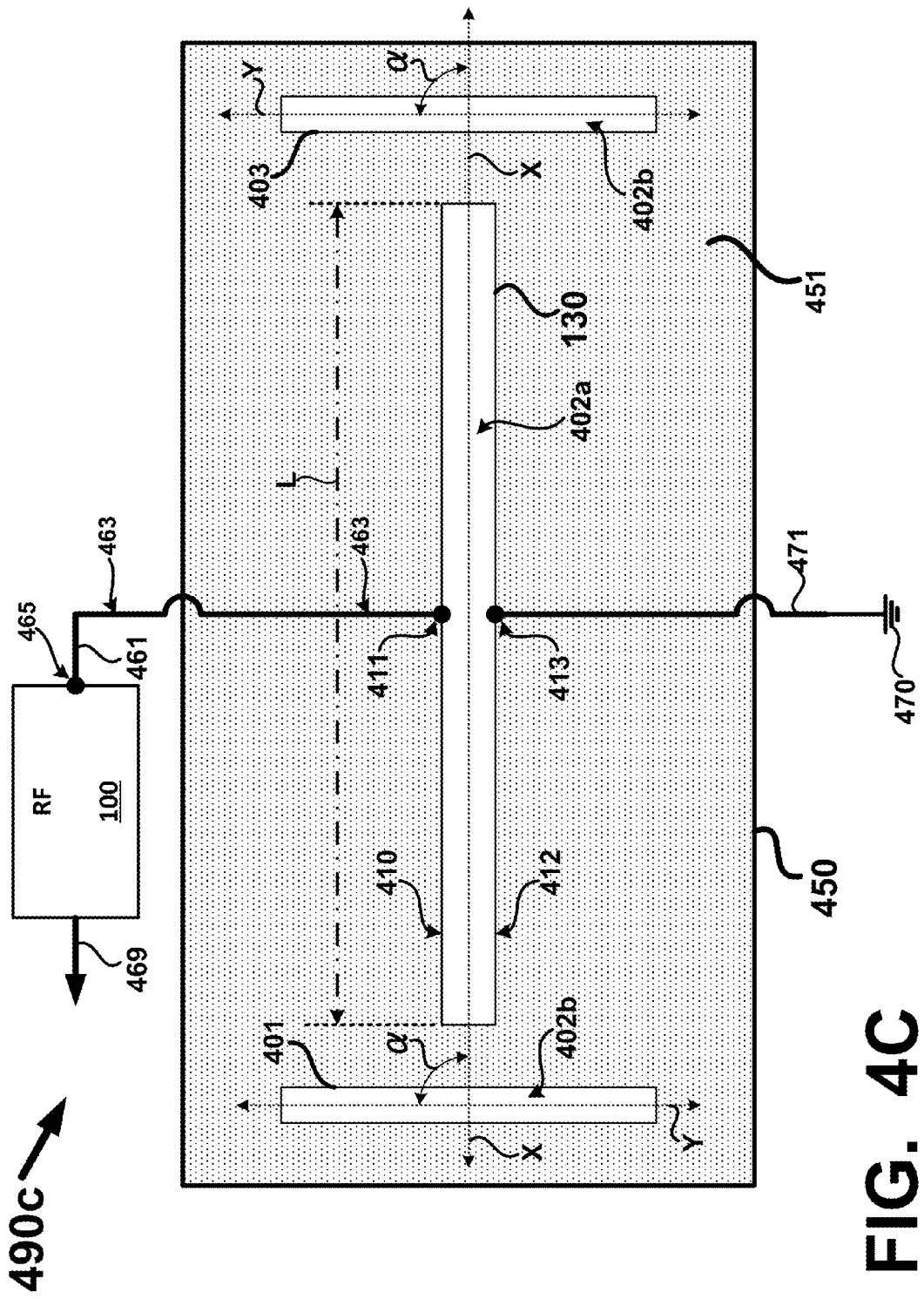
FIG. 4C depicts an example schematic diagram of electrical connections with the antenna, according to an embodiment of the present application.

Attention is now directed to FIG. 4C where a schematic diagram 190c depicts one example of how the opposing sides (410, 412) along the length L dimension of the antenna 130 may be electrically coupled. Node 411 on side 410 is electrically coupled (e.g., 136, 130d, 463) with a RF 100. The electrical coupling (e.g., 136, 130d, 463 to RF Switch 160) may be made using a variety of connection techniques including but not limited to a RF feed, coaxial cable, a wire, a shielded connection, an unshielded connection, a partially shielded connection, an electrically conductive trace, just to name a few. A node 465 of RF 100 may include a termination device 461, such as a SMA connector or the like, configured to make an impedance matching termination, such as 50 ohms, for example. Node 413 on side 412 is electrically coupled 471 with a ground potential 470. The ground potential 470 may include but is not limited to a chassis ground, circuit ground, and power supply ground, just to name a few. The actual selection of the appropriate ground potential may be application dependent and is not limited to the ground potentials described herein. The electrical coupling 471 may use any suitable electrical connection medium including but not limited to wire, a conductive trace, a cable, and a coaxial cable, just to name a few. RF 100 may one or more RF devices including but not limited to RF transceivers for WiFi, Bluetooth, Ad Hoc WiFi, RF transceivers, RF receivers, and RF transmitters. RF 100 may include a RF device configured for and/or devoted to operation with antenna 130 (e.g., a RF receiver). RF 100 may generate one or more signals on an output 469 in response to RF signals received by antenna 130.

In FIG. 4C, an axis X of the antenna 130 is depicted as being orthogonal to an axis Y of the passive slits (401, 403). However, the configuration depicted is just one non-limiting example and the axis of the antenna 130 and passive slits (401, 403), if any, need not have a particular angular orientation. For example, angle α as measured between the X and Y axes need not be 90 degrees (e.g., a right angle) and other angular relationships may be used. Furthermore, any angular relationship between axes of the antenna 130 and the passive slits (401, 403) may vary such that α for 403 may be different than α for 401.

Figure 4D:
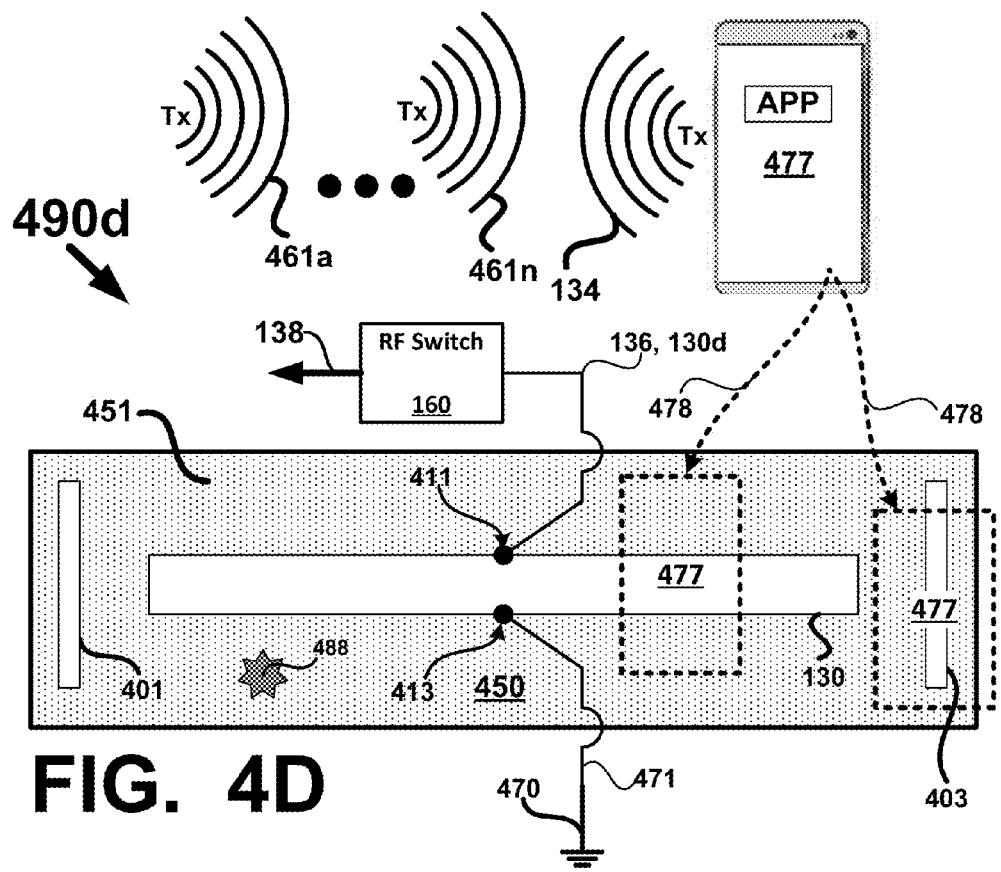
FIGS. 4D-4E depict examples of a live device generating a RF signal that may be detected by a system using an antenna and passive slits, according to an embodiment of the present application.
Figure 4E:
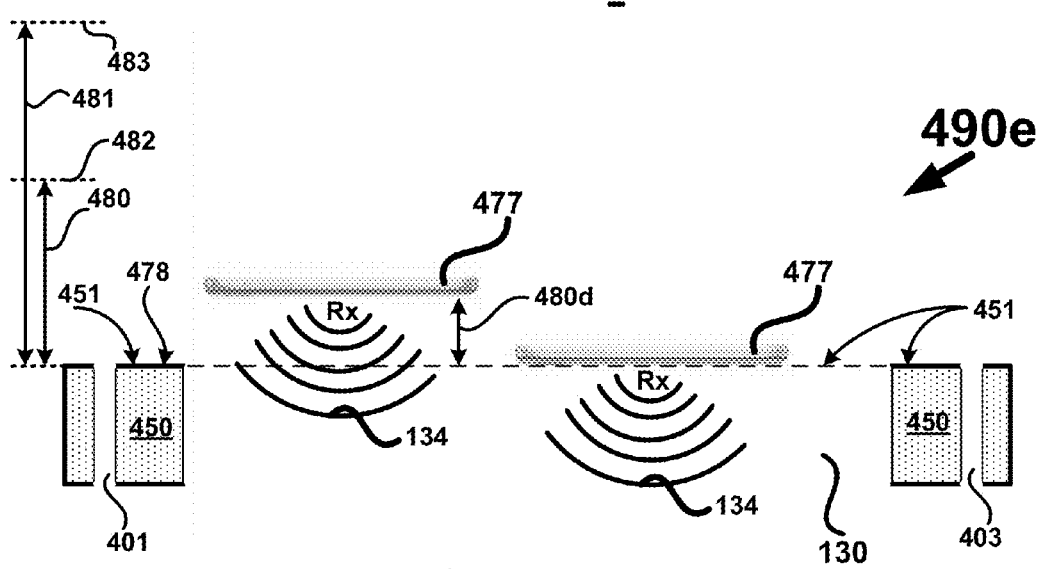

Turning now to FIGS. 4D-4E were examples of a live device 477 transmitting 134 a RF signal that may be detected by a system (e.g., RF 100) using the antenna 130 and passive slits (401, 403). In FIGS. 4D-4E, nodes 411 and 413 may be connected as described in reference to FIG. 4C above. Live device 477 is transmitting Tx a RF signal 134. There may also be other RF sources in an environment in which the live device 477 and/or substrate 450 (and its associated system) reside and those RF sources are denoted as transmitting Tx sources 461a-461n. RF signals from antennas 110 and 120 (e.g., from B1-B4) may also be present in the environment. For purpose of discussion, a live device is a device that is actively transmitting Tx a RF signal or may be activated (e.g., turned on, controlled or commanded) to transmit Tx a RF signal.

In the cross-sectional view of FIG. 4E, live device 477 is depicted in its most preferred placement, which is directly on the surface 451 of substrate 450. Live device 477 may be positioned at a variety of locations on surface 451 and the position on surface 451 is not limited to the position(s) depicted herein. However, in some applications the live device 477 may be placed above the surface 451 at a distance 480d that is in very close near field proximity of the surface 451 of the substrate 450 and its associated antenna 130 and passive slits (401, 403). Although the received RF signal Rx 134 may be at its strongest when the live device 477 is at 480=0 (e.g., directly on surface 451), there may be circumstances where the live device 477 is positioned in very close near field proximity of the surface 451. In the very near field region, the power drop off of RF signal strength may be larger than the well understood $1/R^2$ power drop off rate, and the power drop off may be $1/R^3$ or even $1/R^4$. Therefore, even small distances from surface 451 may result in a large power drop off in RF signal strength as received by antenna 130 and detected by RF 100. Distance 480 is preferably 0.5 meters or less, more preferably 50 mm or less, and even more preferably 30 mm or less. Actual distances for very close near field proximity will be application dependent and are not limited to the examples described herein. The live device 477 may comprise a wide variety of wirelessly enabled devices including but not limited to a smartphone, gaming device, tablet or pad, wireless headset or earpiece, a laptop computer, an image capture device, a wireless wristwatch or timepiece, a data capable strapband or wristband, just to name a few. In some examples, live device 477 may be positioned in near field proximity (e.g., from about 0.5 meters to about 1 meter) of surface 451 of the substrate 450 and its associated antenna 130 and passive slits (401, 403). Actual distances for near field proximity will be application dependent and are not limited to the examples described herein. Here, near field proximity may be represented by a distance 481 from surface 451, where the distance for near field proximity is greater than the distance for very close near field proximity (e.g., 481>480). Therefore, near field proximity may be regarded as a distance that begins approximately were very close near field proximity ends, as denoted by dashed line 482, and extending to an approximate distance denoted by dashed line 483.

In some examples, a user may trigger a mode switch from 2×2 MIMO mode to 1×2 MIMO mode by actuating or pressing a button or the like on a chassis or other structure that houses the substrate 450, such as button 488 on surface 451. Button 488 may be a capacitive touch switch or the like. Button 488 may be positioned at some other location and need not be on substrate 450. The user may press button 488 to signal to a device or system that includes RF 100 that an attempt will presently be made to position a live device (e.g., device 477) directly on top of substrate 450 or into very close near field proximity of substrate 450. RF switch 160 may be signaled 153 to decouple antenna 120 and couple antenna 130 (e.g., in 1×2 MIMO mode) in preparation for detecting Rx 134 from the live device (e.g., device 477). In other examples, an application (APP) or other form of software running on the live device 477 may signal RF 100 using one of its radios (e.g., WiFi or BT) that the live device will presently be positioned directly on or in very close near field proximity of substrate 450. A user may activate the APP using a GUI or other interface provide on a touch screen display or the like on the live device 477 (e.g., a smartphone, tablet, or pad).

In some examples, RF 100 may be configured to switch between 2×2 MIMO mode and 1×2 MIMO mode upon occurrence of some event that may be detected using antennas 110 and/or 120. For example, RF 100 may recognize a RF signature (e.g., via packet sniffing or the like) of a previously recognized wireless device that is typically placed on the substrate 450. RF 100 may upon recognizing the RF signature begin switching back and forth between 2×2 MIMO mode and 1×2 MIMO mode to see antenna 130 detects the proximity of the wireless device while the 1×2 MIMO mode is active. RF 100 or some other system or device in communication with RF 100 may take some action upon detection of a live device (e.g., device 477) including but not limited to establishing a wireless link with the live device, transferring content handling from the live device to another device or system, BT pairing with the live device, just to name a few.

The systems, wireless media devices, apparatus and methods of the foregoing examples may be embodied and/or implemented at least in part as a machine configured to receive a non-transitory computer-readable medium storing computer-readable instructions. The instructions may be executed by computer-executable components preferably integrated with the application, server, network, website, web browser, hardware/firmware/software elements of a user computer or electronic device, or any suitable combination thereof. Other systems and methods of the embodiment may be embodied and/or implemented at least in part as a machine configured to receive a non-transitory computer-readable medium storing computer-readable instructions. The instructions are preferably executed by computer-executable components preferably integrated by computer-executable components preferably integrated with apparatuses and networks of the type described above. The non-transitory computer-readable medium may be stored on any suitable computer readable media such as RAMs, ROMs, Flash memory, EEPROMs, optical devices (CD, DVD or Blu-Ray), hard drives (HD), solid state drives (SSD), floppy drives, or any suitable device. The computer-executable component may preferably be a processor but any suitable dedicated hardware device may (alternatively or additionally) execute the instructions.

As a person skilled in the art will recognize from the previous detailed description and from the drawing FIGS. and claims set forth below, modifications and changes may be made to the embodiments of the present application without departing from the scope of this present application as defined in the following claims.

Although the foregoing examples have been described in some detail for purposes of clarity of understanding, the above-described inventive techniques are not limited to the details provided. There are many alternative ways of implementing the above-described techniques or the present application. The disclosed examples are illustrative and not restrictive.

What is claimed is:

1. An integrated circuit (IC), comprising:
   radio frequency (RF) circuitry configured to implement a 2×2 Multiple-Input/Multiple-Output (MIMO) mode and a 1×2 MIMO mode, the RF circuitry configured to reversibly switch between the 2×2 MIMO mode and the 1×2 MIMO mode in response to a mode signal electrically coupled with a RF switch, the RF circuitry including
   a first RF chain electrically coupled with the RF switch and configured, when the mode signal is set to the 2×2 MIMO mode, to be electrically coupled through the RF switch with a first dual band antenna and to transmit and receive, using the first dual band antenna, first and second dual band RF signals, and
   the first RF chain configured, when the mode signal is set to the 1×2 MIMO mode, to be electrically coupled through the RF switch with a near field proximity detection antenna, and to receive only, using the near field proximity detection antenna, a fifth RF signal, and
   a second RF chain electrically coupled with a second dual band antenna and configured to transmit and receive third and fourth dual band RF signals in the 1×2 or 2×2 MIMO modes.

2. The IC of claim 1, wherein a selected one or more of the first, second, third or fourth dual RF band signals comprise WiFi signals.

3. The IC of claim 1, wherein the third or fourth dual band RF signals comprises a Bluetooth (BT) signal.

4. The IC of claim 1, wherein a selected one or more of the first, second, third or fourth dual RF band signals comprises an Ad Hoc (AH) WiFi signal.

5. The IC of claim 1, wherein the first and second dual band antennas are monolithically integrated on a same semiconductor die as the RF circuitry.

6. The IC of claim 5, wherein the first and second dual band antennas are positioned at opposite corners of the die.

7. The IC of claim 1, wherein the near field proximity detection antenna is external to the RF circuitry and is electrically coupled with the RF circuitry.

8. The IC of claim 1, wherein the RF circuitry is configured to measure relative signal strength of the fifth RF signal using received signal strength indicator (RSSI) measurement.

9. The IC of claim 8, wherein when the RSSI measurement exceeds a threshold value, the RF system generates a signal indicative of a RF transmitting device being in direct contact with, in near field proximity to, or in very close near field proximity to the near field proximity detection antenna.

10. The IC of claim 1, wherein the near field proximity detection antenna comprises a substrate of an electrically conductive material including a plurality of separate apertures formed in the substrate, one or more of the separate apertures comprise passive slits that are electrically decoupled from the RF switch, and another one or more of the separate apertures comprises an antenna having a length edge electrically coupled with the RF switch and an opposing length edge electrically coupled with a ground potential.

11. The IC of claim 10, wherein the antenna comprises a slot antenna.

12. The IC of claim 10, wherein the antenna includes dimensions configured to detune the antenna below a frequency of a selected one or more of the first, second, third, or fourth dual band RF signals.

13. The IC of claim 10, wherein the first dual band antenna, the second dual band antenna, or both are configured to transmit and receive RF signals at two different RF frequencies comprising 2.4 GHz and 5 GHz.

14. A method for multiple dual band wireless communication and wireless near field proximity detection, comprising:
   setting a state of a mode signal in a radio frequency (RF) system including circuitry for a 2×2 Multiple-Input/Multiple-Output (MIMO) mode and a 1×2 MIMO mode;
   coupling, when the mode signal is set to the 2×2 MIMO mode, a first RF chain of the RF system with a first dual band antenna configured to transmit and receive first and second dual band RF signals;
   coupling, when the mode signal is set to the 2×2 MIMO mode or the 1×2 MIMO mode, a second RF chain of the RF system with a second dual band antenna configured to transmit and receive third and fourth dual band RF signals; and
   coupling, when the mode signal is set to the 1×2 MIMO mode, the first RF chain with a near field proximity detection antenna, the first RF chain configured to only receive a fifth RF signal from the near field proximity detection antenna when the 1×2 MIMO mode is set.

15. The method of claim 14, wherein the near field proximity detection antenna comprises a detuned slot antenna.

16. The method of claim 14, wherein the near field proximity detection antenna comprises a substrate of an electrically conductive material including a plurality of separate apertures formed in the substrate, one or more of the separate apertures comprise passive slits that are electrically decoupled from the RF switch, and another one or more of the separate apertures comprises an antenna having a length edge electrically coupled with the RF switch and an opposing length edge electrically coupled with a ground potential.

17. A multi-channel dual band wireless communication and wireless near field proximity detection system, comprising:
   circuitry configured to implement a 2×2 Multiple-Input/Multiple-Output (MIMO) mode and a 1×2 MIMO mode, the circuitry configured to reversibly switch between the 2×2 MIMO mode and the 1×2 MIMO mode in response to a mode signal electrically coupled with a RF switch, the circuitry including
   a first RF chain electrically coupled with the RF switch and configured, when the mode signal is set to the 2×2 MIMO mode, to be electrically coupled through the RF switch with a first dual band antenna and to transmit and receive first and second dual band RF signals using the first dual band antenna, and
   configured, when the mode signal is set to the 1×2 MIMO mode, to be electrically coupled through the RF switch with a near field proximity detection antenna and to receive only, using the near field proximity detection antenna, a fifth RF signal, and
   a second RF chain electrically coupled with a second dual band antenna and configured, when the mode signal is set to the 2×2 MIMO mode or the 1×2 MIMO mode, to transmit and receive third and fourth dual band RF signals using the first dual band antenna.

18. The system of claim 17, wherein the near field proximity detection antenna comprises a substrate of an electrically conductive material including a plurality of separate apertures formed in the substrate, one or more of the separate apertures comprise passive slits that are electrically decoupled from the RF switch, and another one or more of the separate apertures comprises an antenna having a length edge electrically coupled with the RF switch and an opposing length edge electrically coupled with a ground potential.

19. The system of claim 18, wherein the antenna includes dimensions configured to detune the antenna below a target frequency.

20. The system of claim 17, wherein the near field proximity detection antenna is configured to generate the second RF signal in response to an external wireless device that transmits a fifth RF signal and is placed directly on, in near field proximity to, or in very close near field proximity to the near field proximity detection antenna.

\* \* \* \* \*